United States Patent
Sesita et al.

(10) Patent No.: US 7,339,299 B2
(45) Date of Patent: Mar. 4, 2008

(54) ELECTRIC ACTUATOR AND MOTOR USED THEREIN

(75) Inventors: Naoto Sesita, Kawasaki (JP); Katuyuki Tanaka, Kawasaki (JP); Yusuke Mizukoshi, Kawasaki (JP); Hiroyuki Kurihara, Fujisawa (JP); Yoshihisa Watanabe, Yokohama (JP); Kazuhito Yokomori, Nirasaki (JP)

(73) Assignees: Igarashi Electric Works Ltd. (JP); Mitsui Mining And Smelting Co., Ltd. (JP)

( * ) Notice: Subject to any disclaimer, the term of this patent is extended or adjusted under 35 U.S.C. 154(b) by 0 days.

(21) Appl. No.: 11/410,753

(22) Filed: Apr. 25, 2006

(65) Prior Publication Data

US 2006/0238048 A1 Oct. 26, 2006

(30) Foreign Application Priority Data

Apr. 26, 2005 (JP) ............................. 2005-128434
Apr. 26, 2005 (JP) ............................. 2005-128436

(51) Int. Cl.
*H02K 1/17* (2006.01)
*H02K 5/10* (2006.01)
*H02K 7/116* (2006.01)
*H02K 5/26* (2006.01)
*E05F 15/10* (2006.01)

(52) U.S. Cl. ................ 310/89; 310/75 R; 310/90; 310/154.01

(58) Field of Classification Search ............ 310/89, 310/239, 75 R
See application file for complete search history.

(56) References Cited

U.S. PATENT DOCUMENTS

| 5,184,039 | A | * | 2/1993 | Kraft ............................. 310/89 |
| 5,895,207 | A | * | 4/1999 | Burgdorf et al. ........... 417/410.1 |
| 6,459,188 | B1 | * | 10/2002 | Lombardo et al. ........... 310/239 |
| 2002/0175573 | A1 | * | 11/2002 | Hayashi ......................... 310/54 |
| 2004/0012280 | A1 | * | 1/2004 | Frey et al. .................. 310/75 R |
| 2004/0012296 | A1 | * | 1/2004 | Sakai et al. .................. 310/239 |
| 2004/0070296 | A1 | * | 4/2004 | Ursel et al. .................... 310/90 |
| 2004/0164629 | A1 | * | 8/2004 | Kawakami et al. ......... 310/75 R |
| 2004/0189117 | A1 | * | 9/2004 | Hama et al. .................... 310/71 |
| 2004/0189120 | A1 | * | 9/2004 | Takashima et al. ............. 310/89 |

FOREIGN PATENT DOCUMENTS

| DE | 27 29 398 | * 11/1979 |
| JP | 2005-30545 | 2/2005 |

* cited by examiner

*Primary Examiner*—Burton Mullins
(74) *Attorney, Agent, or Firm*—Ostrolenk, Faber, Gerb & Soffen, LLP

(57) ABSTRACT

A motor comprises a rotor fixed to a shaft and a stator comprising a permanent magnet on the inner circumferential surface of a motor casing. The shaft extends from the opening end of the motor casing and has a worm wheel in a gear casing. The end face of the gear casing has an annular projection. The motor casing has an outward flange at the opening end. When the motor casing is connected with the gear casing, an elastic O-ring is fitted between a space formed by the outer circumferential surface of the annular projection, an outer vertical seat face of the gear casing and a corner of the outward flange thereby achieving suitable alignment of the motor casing with the gear casing. The permanent magnet is made of Nd magnet which is pressingly fitted on the inner circumferential surface of the motor casing.

6 Claims, 3 Drawing Sheets

ELECTRIC ACTUATOR AND MOTOR USED THEREIN

BACKGROUND OF THE INVENTION

The present invention relates to an electric actuator and a motor used in the actuator, and especially to an electric actuator used in a power tailgate and a power sliding door of an automobile.

It is required for such an electric actuator to be small and light with increased output power since space and weight of the car body are limited.

As shown in JP2005-30545A, an electric actuator comprises a motor casing of a motor part and a gear casing of an actuator part which can be separated from each other. A worm of a shaft in the motor part is engaged with a worm wheel of the actuator part.

A rotor fixed to the base end of the shaft faces a permanent magnet as stator bonded on the inner circumferential surface of the motor casing.

However, when the motor casing is connected to the gear casing in the electric actuator, both are made of Al alloy to make press-fit difficult. So it is necessary to provide a slight clearance between them, which is likely to cause vibration in the motor casing.

Errors in accuracy of the motor casing with respect to the gear casing promotes unevenness in accuracy of the connection of them, making it impossible to keep the clearance between the permanent magnet and rotor constant. Such misalignment makes motor performance decreased.

To improve connection accuracy between the gear casing and motor casing, it is necessary to increase accuracy in working of each casing significantly, which causes not only high cost but also decrease in productivity.

Meanwhile, to fix the permanent magnet as stator on the inner circumferential surface of the motor casing, the magnet is put into the motor casing and heated with drying while adhesive is applied on the outer circumferential surface of the permanent magnet. The three steps make assembling time prolonged.

A working room becomes likely to be contaminated with the adhesive. Also, odor peculiar to the adhesive makes the environment worse, which requires sufficient air conditioning. The edges for the adhesive are likely to cause a gap between the motor casing and permanent magnet or between the permanent magnet and rotor. So balance in motion of the rotor gets poorer.

Furthermore, concentricity of the internal diameter of the permanent magnet to the center is poor after the connection of the motor casing, making it impossible to reduce the gap between the permanent magnet and rotor. Magnetic force of the permanent magnet is not able to efficiently act, which is obstacle against the improvement in motor performance.

SUMMARY OF THE INVENTION

In view of the disadvantages, it is an object of the invention to provide a small high-output electric actuator in which a motor casing is accurately aligned with a gear casing without increasing working accuracy of each part to improve motor performance together with less vibration of the motor casing, easier and simpler assembling and increased productivity at low cost.

It is another object of the invention to provide an electric motor in which a permanent magnet is provided as stator on a motor casing without adhesive.

BRIEF DESCRIPTION OF THE DRAWINGS

The features and advantages of the invention will become more apparent from the following description with respect to an embodiment as shown in appended drawings wherein.

DETAILED DESCRIPTION OF PREFERRED EMBODIMENTS

Figure 1:
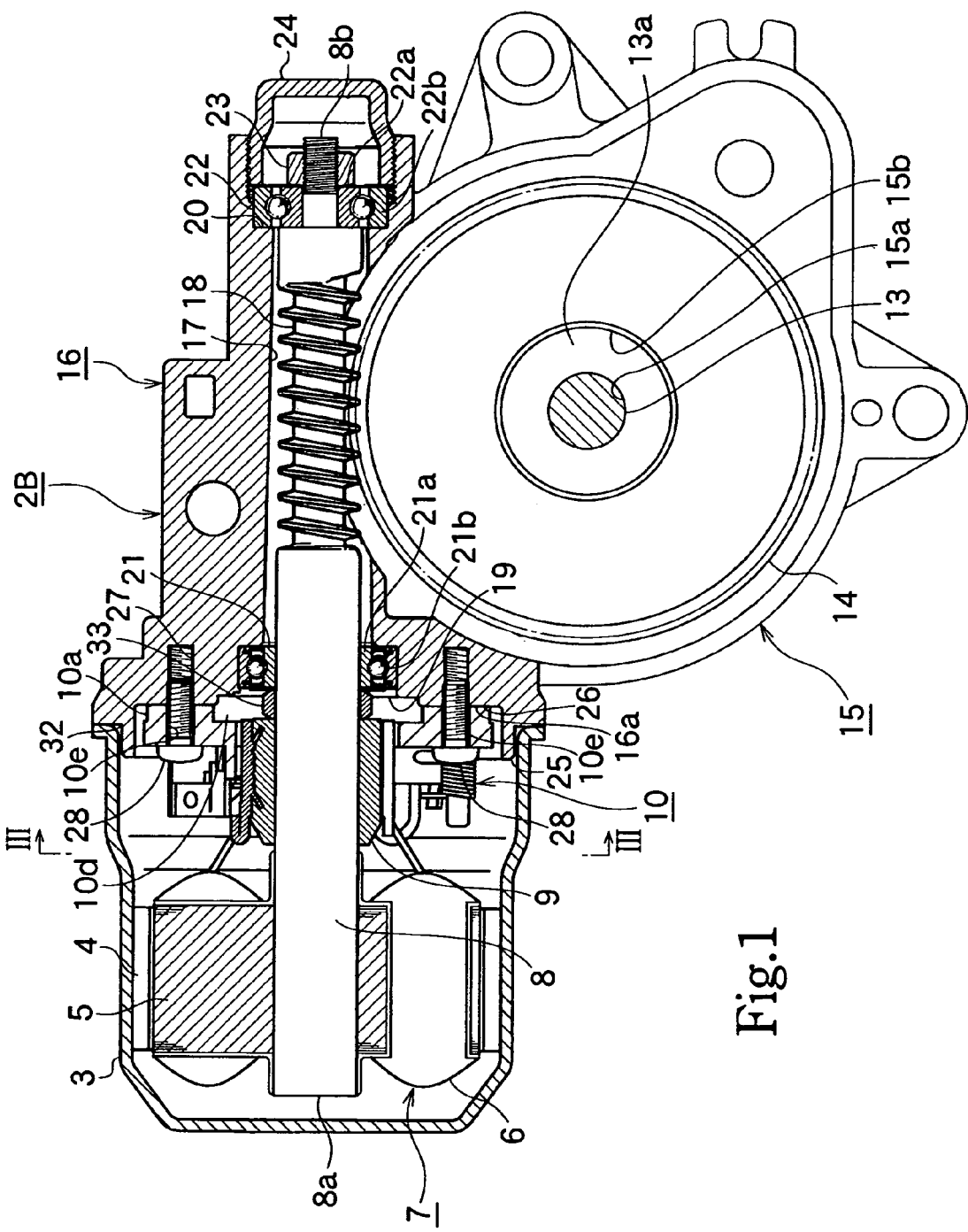
FIG. 1 is a partially sectional side view of an electric actuator according to the present invention.
Figure 2:
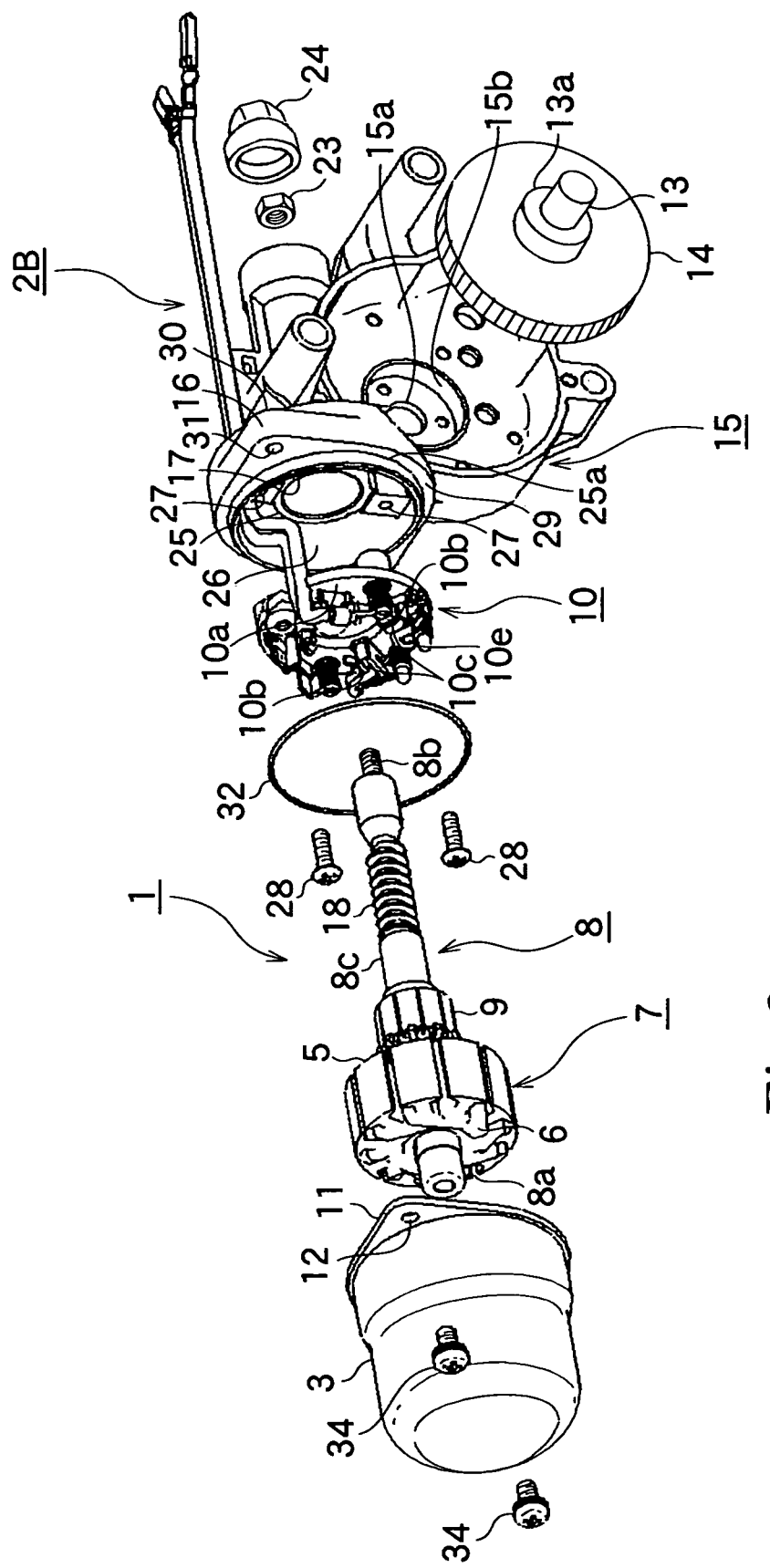
FIG. 2 is an exploded perspective view of a motor part and an actuator part.

In an embodiment of the present invention, as shown in FIGS. 1 and 2, an electric actuator 1 comprises a motor part 2A and an actuator part 2B which can be detached from each other. The motor part 2A comprises a motor casing 3 also used as yoke made of Al alloy deep-drawn bottom-having cylinder; a stator 4 fixed on the inner circumferential surface of the motor casing 3; a rotor 7 comprising an iron core 5 on which a coil 6 is wound, inside the stator 4; a shaft 6 to which the rotor 7 is fixed; a commutator 9 fixed to the shaft 8; and a brush unit 10 that charges the commutator 9.

The stator 4 comprises a permanent magnet made of Nd—Fe—B magnet which Nd, Fe and B are mixed with binder resin to form a ring having the inner circumferential surface on which N- and S-poles are equally spaced alternately in a circumferential direction.

The Nd—Fe—B magnet is known to provide high magnetism and used as field magnet which is thin and small, but provide high torque.

The external diameter of the annular permanent magnet made of Nd magnet as the stator 4 is slightly larger than the internal diameter of the inner circumferential surface of the motor casing 3. To mount the permanent magnet on the inside of the motor casing 3, both are disposed under high-temperature atmosphere and the magnet is pressingly fitted into the inner circumferential surface of the motor casing 3 with a suitable jig to allow them to be constructed together without adhesive.

Assembling of the permanent magnet within the motor casing renders time shorter than known methods where an adhesive is applied to a permanent magnet and does not produce contamination or odor within a working room to improve working condition. Neither bonding edge nor deviation thereof significantly improves concentricity and roundness of the internal diameter of the permanent magnet with respect to the center of the rotation after assembling thereby reducing a gap between the permanent magnet and the rotor 7 to enable high output power.

The rotor 7 is fixed to the base end 8a of the shaft 8 and the commutator 9 is fixed to the shaft 8 at the opening end of the motor casing 3. The base end 8a of the shaft 8 is relatively thick to provide rigidity enough to bear the weight of the fixed rotor 7.

Figure 3:
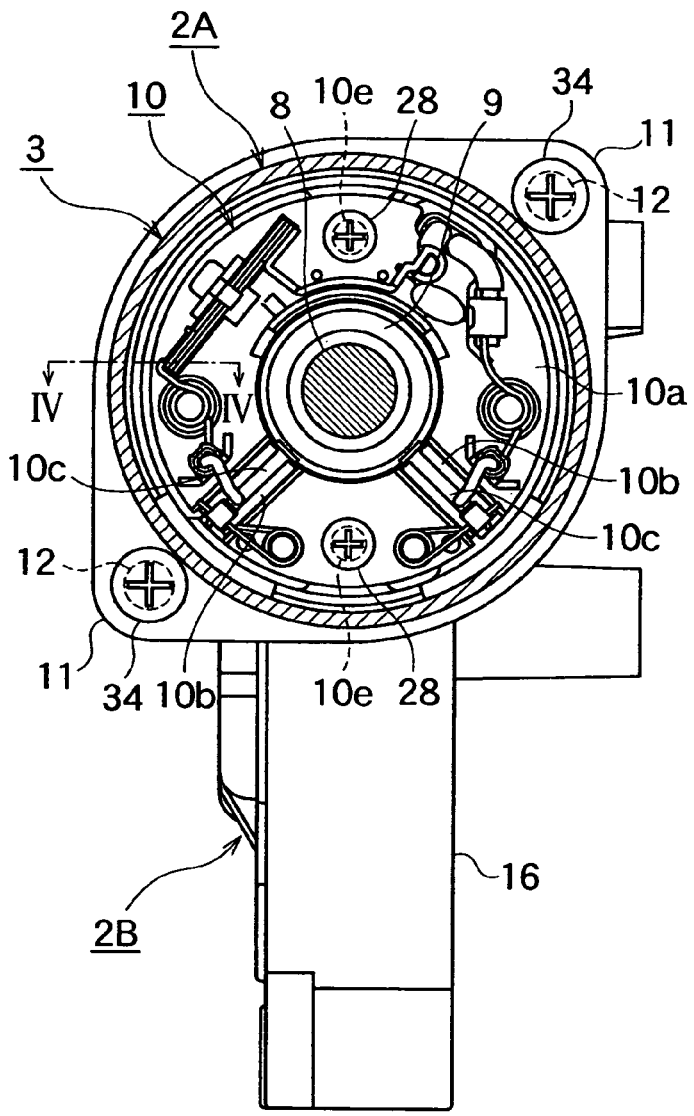
FIG. 3 is a vertical sectional view seen from the line III-III to show the connection of a motor casing with an actuator casing.

As shown in FIG. 3, the brush unit 10 comprises a circuit board 10a and a brush 10c connected to the circuit board 10a via a brush holder 10b. A brush 10c is disposed perpendicular to an axis of the commutator 9 to be in sliding contact with the commutator 9. The circuit board 10a has a through-hole 10d through which the shaft passes at the center; and a pair of upper and lower holes 10e, 10e corresponding to a pair of upper and lower female-thread holes 27,27 of a gear casing 16 later described.

Figure 4:
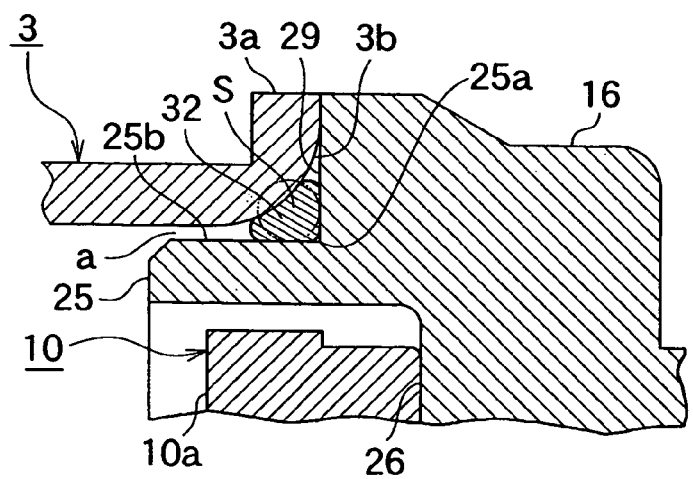
FIG. 4 is an enlarged sectional view taken along the line IV-IV in FIG. 3 to show the connection of the motor casing with the actuator casting.

As shown in FIG. 4, the opening end of the motor casing 3 is bent radially outwards at almost right angles to form an outward flange 3a circumferentially and an inner corner 3b is rounded.

On the outer circumference of the outward flange 3a, a pair of ears 11, 11 is projected outwards on a diagonal line symmetrically with respect to an axis of the shaft 8 and a hole 12 are formed in the ears 11.

In the actuator part 2B, a wheel casing 15 which includes a worm wheel 14 mounted to an output shaft 13 via a bearing 13a is molded of Al together with a gear casing 16 including the shaft 8 which extends from the motor part 2A.

At the center of the wheel casing 15, there are formed a through-hole 13a and a bearing-receiving portion 15b surrounding the through-hole 13a.

The bearing 13a pressingly fits in the bearing-receiving portion 13a. The shaft 8 extends through an axial hole 17 of the gear casing 16. On the end 8b of the shaft 8 in the gear casing 16, a worm gear 18 is formed and meshes with a worm wheel 14 in the wheel casing 15.

At the inner and outer ends of the axial hole 17, there are larger-diameter axial holes 19,20 in which first and second ball bearings 21,22 receives axial and radial load of the shaft 8.

The first ball bearing 21 has an inner race 21a in which the shaft 8 is pressingly fitted, and an outer race 21b is fitted in a larger-diameter hole 19 to support an intermediate part 8c of the shaft 8 or between the base end 8a and the worm gear 18.

In the second ball bearing 22, the end 8b of the shaft 8 is pressingly fitted in an inner race 22a. An outer race 22b fits in a larger-diameter axial hole 20 which opens outwards of the gear casing 16 opposite to the motor casing 3 to allow the end 8b of the shaft 8 to be rotatably held, so that the shaft 8 is held only at each end of the worm gear 18 in the gear casing 16 like a cantilever.

Thus, the part near the base end 8a of the shaft 8 is axially short avoiding necessity for creating a space for a bearing at the end of the motor casing 3 and reducing the axial length of the motor casing 3 to make the whole size reduced and lightened and to reduce the number of parts, whereby the structure is simplified and the cost is reduced.

The end 8b comprises a smaller-diameter shaft of which the outer circumferential surface is threaded. The smaller-diameter shaft is pressingly fitted in the inner race 22a of the second ball bearing 22 which engages in the outer larger-diameter hole 20 of the axial hole 17 to make it projected outwards. A nut 23 engages on the projection to allow the shaft 8 to be fixed to the inner race 22a, thereby preventing the shaft 8 from moving axially.

The outer race 22b of the ball bearing 22 engaged in the outer larger-diameter hole 20 is fixed by a cap 24 engaged in the axial hole 17 thereby fixing the inner race with the nut 23 and preventing the end 8b of the shaft 8 from moving axially and radially. Thus, when the shaft 8 rotates, the end 8b of the shaft 8 is prevented from bending due to engagement reaction force of the worm gear 18 with the worm wheel 14, so that the worm wheel 14 is prevented from being damaged.

An annular projection 25 is formed around an axis on an end face 16a of the gear casing 16 contacting the opening end of the motor casing 2. An annular groove 26 is formed in the annular projection 25. The annular groove 26 has a pair of upper and lower female bores 27,27 corresponding to a pair of holes 10e, 10e of the circuit board 10a of the brush unit 10.

The brush unit 10 which holds the brush 10a slidably contacting the commutator 9 engages in the annular groove 26 and mounted with the bolts 28,28 in the female bores 27,27 through the holes 10e, 10e of the circuit board 10a.

A vertical seat face 29 is circumferentially formed on an outer base portion 25a of the annular projection 25 to receive the outward flange 3a at the opening end of the motor casing 3. A pair of mounting ears 30,30 is formed to project outwards on a diagonal line symmetrical with the axis of the shaft 8 on the outer circumferential surface of the end face 29 corresponding to the mounting ears 11,11 formed on the opening end of the motor casing 3. A female bore, 31 is formed in the mounting ear 30.

As shown in FIGS. 2 and 4, on the outer circumferential surface of the annular projection 25, an elastic rubber O-ring 32 is fitted and has slightly smaller diameter than the external diameter of the annular projection 25. The O-ring 32 is stretched and expanded to allow it to fit on the outer circumferential surface 25b tightly.

The O-ring 32 is deformably inserted in a space "S" created by the inner rounded corner 3b of the opening end of the motor casing 3, the outer circumferential surface 25b of the annular projection 26 and the seat face 29 of the gear casing 16.

As shown in a two-dotted line in FIG. 4, the O-ring 32 has a circular cross-section slightly greater than the area of the space "S". Thus, when the motor casing 3 is connected to the gear casing 16 by pressing the inner rounded corner 3b of the motor casing 3 onto the outer circumferential surface 25b of the annular projection 3b of the gear casing 16, the O-ring 32 is elastically collapsed and deformed by pressing force onto the inner rounded corner 3b of the motor casing 3.

The O-ring 32 comes into a gap "a" between the inner circumferential surface of the motor casing 3 and the outer circumferential surface 25b of the annular projection 25 of the gear casing 16. By its repulsive force, reaction force acts uniformly to press the inner rounded corner of the motor casing 3 outwards in a radial direction to make alignment to allow the gap "a" to become constant in a circumferential direction thereby achieving suitable alignment of the axes of the motor casing 3 and the gear casing 16.

As shown in FIG. 1, the first bearing 21 which axially supports the intermediate part of the shaft 8 is disposed close to the commutator 9 fixed to the motor casing 3.

A collar 33 is put on the shaft 8 and comprises an elastic rubber ring having a vertical cross-section of trapezoid. Its end face pressingly contacts the inner race 21a of the first ball bearing 21 to apply axially outward force to the inner race 21a.

Thus, during rotation of the shaft 8, with engagement reaction force of the worm gear 18 with the worm wheel 14, applied force of the collar 33 prevents the inner race from moving axially toward the motor casing 3 thereby preventing vibration or noise of the inner race 21a and preventing lubricating oil applied onto the shaft 8 and the ball bearing 21 from leaking.

The collar 33 comprises an elastic rubber ring having trapezoidal cross-section gradually expanding towards the axis of the shaft 8 to increase absorption owing to axial stretching of the shaft 8 and to cope well with unevenness in accuracy of parts in axial size of the commutator pressingly fitted in the shaft 8 and depth-size direction of the motor casing 3 thereby reducing high cost for improving accuracy of parts.

When the motor casing 3 is connected to the gear casing 16, a pair of mounting ears 11,11 at the opening end of the motor casing 3 contacts a pair of mounting ears 30,30 of the seat face 29 of the gear casing 16, and a pair of bolts 34,34 are inserted into bores 12,12 of the ears 11,11 from the side of the motor casing 3, so that the bolts 34,34 are engaged in the female bores 34,34 of the ears 30,30 of the gear casing 16. Thus, the motor casing 3 is connected to the gear casing 16 at two points.

The foregoing merely relates to an embodiment of the invention. Various changes and modifications may be made by a person skilled in the art without departing from the scope of claims wherein:

What is claimed is:

1. An electric actuator comprising:
    a motor comprising a rotor and a stator, the stator comprising a permanent magnet:
    a motor casing surrounding the motor, the stator being in the motor casing such that the permanent magnet is fixed on an inner circumferential surface of the motor casing, the motor casing having a closed end and an open end having an outward flange with an inner corner;
    a shaft operable to be driven by the motor and extending from the open end of the motor casing, said shaft having a worm wheel as an extended part, said shaft having a first end close to the closed end of the motor casing, and a second end opposite to the first end;
    at most two ball bearings positioned and configured radially with respect to the shaft to rotatably support the shaft, the at most two ball bearings comprising a first ball bearing at a middle of the shaft, and a second ball bearing at the second end of the shaft;
    a gear casing including the worm wheel of the shaft, said gear casing comprising:
    an end face that faces the open end of the motor casing,
    an annular projection being axially formed on the end face of the gear casing and having an outer circumferential surface, and
    a vertical seat face extending from the annular projection outwards; and
    an elastic O-ring positioned in a space formed by the seat face of the gear casing and the outer circumferential surface of the annular projection and the inner corner of the outward flange of the motor casing.

2. The electric actuator as claimed in claim 1, wherein an inner corner is rounded.

3. The electric actuator as claimed in claim 2, wherein the O-ring has a diameter slightly smaller than an external diameter of the annular projection to achieve tight-fitting of the O-ring.

4. The electric actuator as claimed in claim 2, wherein a traverse section of the O-ring is slightly larger than an area of the space formed by the seat face of the gear casing, the outer circumferential surface of the annular projection and the inner corner.

5. The electric actuator as claimed in claim 2, wherein a pair of ears projects from the open end of the motor casing at a position on a diagonal line symmetrical with an axis of the shaft, said pair of ears having first holes respectively, the end face of the gear casing having second holes, a bolt being threaded to each of the second holes through each of the first holes so that the motor casing is pressingly connected to the gear casing.

6. The electric actuator as claimed in claim 1, wherein the magnet is made of Nd—Fe—B.

* * * * *